United States Patent [19]

Young

[11] 4,238,470

[45] Dec. 9, 1980

[54] METHOD FOR OIL-TREATING INSOLUBLE SULFUR

[75] Inventor: Randall A. Young, Milford, Conn.

[73] Assignee: Stauffer Chemical Company, Westport, Conn.

[21] Appl. No.: 62,447

[22] Filed: Jul. 30, 1979

[51] Int. Cl.³ .............................................. C01B 17/12
[52] U.S. Cl. .................................... 423/567 R; 260/775
[58] Field of Search ....................... 423/265, 267, 567; 23/293 S, 308 S; 260/775 X, 776, 799

[56] References Cited

U.S. PATENT DOCUMENTS

| | | | |
|---|---|---|---|
| 1,875,372 | 9/1932 | Endres | 260/775 |
| 2,460,365 | 2/1949 | Schallis | 423/567 |
| 2,569,375 | 9/1951 | Grove | 423/567 |
| 2,614,908 | 10/1952 | Railsback | 423/567 |
| 2,757,075 | 7/1956 | Haimsohn | 423/265 |
| 2,947,614 | 8/1960 | Manthey | 423/567 |

FOREIGN PATENT DOCUMENTS 649408  8/1962  Canada ...................................... 423/467

*Primary Examiner*—G. O. Peters
*Attorney, Agent, or Firm*—William C. Gerstenzang

[57] ABSTRACT

Processing oil used to treat insoluble sulfur is mixed with iodine to inhibit its effect on the reversion rate of the insoluble sulfur.

7 Claims, No Drawings

METHOD FOR OIL-TREATING INSOLUBLE SULFUR

BACKGROUND OF THE INVENTION

The present invention relates to a method for oil treating insoluble sulfur. More particularly, the present invention relates to a method for oil treating insoluble sulfur wherein the stability of the insoluble sulfur is not adversely affected by the oil treatment. Specifically, the present invention relates to a method of inhibiting the destabilizing effect of an oil on insoluble sulfur which is treated with the oil.

Insoluble sulfur is, by definition, sulfur which is insoluble in carbon disulfide. This form of sulfur is generally understood to be polymeric in nature, the polymer chains being made up of up to several thousand sulfur atoms. Insoluble sulfur is distinguished from soluble sulfur, which is crystalline in form.

As a practical matter, most commercial grades of insoluble sulfur contain both soluble and insoluble sulfur. Commercial insoluble sulfur products with varying amounts of insoluble sulfur are available.

The most important use for insoluble sulfur is as a vulcanizing agent in the rubber-making industry. In this industry, sulfur is used as a cross-linking (vulcanizing) agent in rubber compound formulations.

Although soluble sulfur would fulfill the basic cross-linking requirements for the rubber formulations, the inclusion of soluble sulfur in rubber compositions results in processing difficulties which, in turn, cause defects in products made from such compositions. The two most common problems caused by the use of soluble sulfur are "bloom" and "bin scorch".

Sulfur bloom is the crystallization of sulfur on the surface of rubber articles. This is caused by the migration of sulfur from the interior of a rubber article to the surface. This phenomenom results because the sulfur is soluble in the rubber at mixing (masticating) temperatures, but when the mixture is cooled after mixing, the solubility limits are reduced and a supersaturated solid solution is formed. As the mixture cools and the lower solubility limits become controlling, sulfur beings to come out of the solid solution. As it comes out of solution, the sulfur migrates to the surface of the rubber article and crystallizes.

This surface bloom becomes a serious problem because it destroys the natural tack of the rubber in the affected area. When several plies of rubber are assembled together to construct tires, belts, hoses or the like; the sulfur bloom interferes with the natural cohesion between adjacent plies and faults, such as air bubbles, result.

When insoluble sulfur is used, however, surface bloom is eliminated. Insoluble sulfur becomes evenly distributed throughout the rubber composition during the mixing (mastication) step, but does not go into solution in the rubber composition. The distribution of the insoluble sulfur remains as it was when dispersed, there is no concentration gradient formed; and migration does not occur.

It is only when the final article is vulcanized that the insoluble sulfur reverts to a soluble form and goes into solution. The vulcanization reaction takes place at the same time and the sulfur becomes part of a high-polymer product. The sulfur thus becomes chemically bound and cannot bloom upon cooling of the rubber mass.

Another serious problem caused by the use of soluble sulfur in rubber formulations is that of bin scorch. Bin scorch occurs when an uncured rubber composition is kept in storage after having been fully compounded (i.e., mixed, milled, etc.). The uncured rubber composition is temperature sensitive, and curing (i.e., crosslinking) may be prematurely initiated to some extent if storage temperature is not properly controlled. This is known as "bin scorch".

When insoluble sulfur is used, bin scorch is retarded to a point where it ceases to be a problem. Since insoluble sulfur is available for reaction only when curing (vulcanizing) temperatures are reached, no significant reaction takes place at lower temperatures. At these lower temperatures the insoluble sulfur merely remains as a suspended solid surrounded by rubber, until vulcanization takes place.

Because of the technical advantages offered by insoluble sulfur as compared to soluble sulfur, a great deal of technical activity has been devoted to the development of methods for producing insoluble sulfur in preference to soluble sulfur. This effort has been successful and at the present time there are a number of methods known in the art by which sulfur products comprising 90% insoluble sulfur or more can be produced.

Unfortunately, however, the insoluble form of sulfur is metastable and tends to revert, over a period of time, to the soluble form. Typically, an unstabilized sulfur product having about 90% insoluble sulfur will revert to a product having only about 70 to about 75% insoluble sulfur over a period of about 20 hours when stored at a temperature of about 60° C.

A number of stabilizers have been developed to retard the reversion of insoluble sulfur to the soluble form. These stabilizers, in general, are capable of reducing the reversion rate by about 80%.

Insoluble sulfur, in addition to being treated with a stabilizer to retard reversion, is also usually treated with an oil to control the tendency of the sulfur (often in fine particulate form) to form dust and also to make it easier to disperse in organic compositions with which it is to be blended. Oil-treated insoluble sulfur products can contain from about 1% up to about 30% oil (by weight) and from about 99% to about 70% sulfur (by weight). At these ratios, the product remains dry to the touch and can be handled as a dry powder.

Unfortunately, however, some oils tend to increase the reversion rate of the insoluble sulfur even though it has been "stabilized". The mechanism by which oil-treatment of stabilized insoluble sulfur causes it's reversion rate to increase is not fully understood. Moreover, it is difficult to predict whether any given processing oil will or will not affect the stabilized insoluble sulfur in this way. In actual practice it has become customary to screen each batch of oil by actually treating a small quantity of stabilized insoluble sulfur with it and measuring its effect on the reversion rate.

In addition to the problem of screening oil batches for use in oil-treating sulfur, producers are faced with the possibility that oil which does not adversely affect stability may not always be readily available. As the general availability of petroleum products continues to diminish, these problems may be expected to become more severe.

It is therefore highly desirable that a method be found for inhibiting the tendency of processing oils to accelerate the reversion rate of insoluble sulfur. With such a method available, a much greater variety of oils could be used for oil-treating sulfur, and the ultimate sources of supply for such oils would be widely expanded.

BRIEF SUMMARY OF THE INVENTION

In accordance with the present invention there is provided a method for inhibiting the accelerating effect of a rubber processing oil on the rate of reversion of insoluble sulfur with which it is mixed to soluble sulfur, which comprises adding iodine to the oil in an amount sufficient to inhibit the reversion accelerating effect of the oil.

The method of the present invention is one which affects the destabilizing characteristics of an oil with respect to insoluble sulfur. Thus, the stability of insoluble sulfur which is treated with an oil in accordance with the present invention remains about the same as it would have been had it not been oil-treated.

DETAILED DESCRIPTION OF THE INVENTION

The present invention is to be distinguished from the process taught in U.S. Pat. No. 2,061,185 wherein iodine is blended with sulfur to produce a product which is free-flowing, even when stored under damp conditions; and from the process taught in U.S. Pat. No. 2,460,365, wherein sulfur is treated with a halogen to stabilize it.

The present invention is concerned with preventing the rate of reversion of insoluble sulfur to soluble sulfur from being accelerated by oil-treatment of the sulfur; or at least, reducing the extent to which it is accelerated. Thus, the present invention is not practiced to increases the stability of the insoluble sulfur, but rather to retain the stability close to its original level when the sulfur is oil-treated.

In the practice of the present invention, a small quantity of iodine is blended into the oil which is to be treated. The amount of iodine required generally ranges from about 1 to about 200 milligrams per liter of oil and preferably from about 5 to about 100 milligrams per liter.

The actual amount of iodine used will vary in accordance with several factors. The primary consideration is, of course, that a sufficient amount of iodine be used to effectively treat the oil. This may vary from one oil to another and the minimum effective amount required for any particular oil should be determined by small scale experimentation. On the other hand, if too much iodine is used, the oil may become discolored and therefore unsuitable for many applications. Thus, for example, where it is important that a rubber product being prepared remain colorless, care must be taken that the individual components added to the rubber formulation do not discolor it. If too much iodine is added to the oil the color of the rubber formulation with which the oil-treated sulfur is mixed could be adversely affected. It is well within the skill in the art to determine the specific amount of iodine to be used within the ranges stated above so as to achieve the desired effectiveness, with due regard to color considerations.

The iodine may be blended with the oil using standard techniques for adding and blending additive quantities of one material to bulk quantities of another. Thus, for example, the required amount of iodine may be added directly to the oil and the oil mixed sufficiently to assure a uniform distribution of the iodine throughout the oil, or the iodine may be first dissolved in a small quantity of a suitable solvent and added to the oil as a solution. When the iodine is added directed to the oil, it may be added and blended at ambient temperatures since the iodine is readily soluble in the oil.

Despite the fact that the iodine may be added directly to the oil in bulk quantities, it will be found more convenient and more precise to add the iodine as a solution in an appropriate solvent. Solvents which may be used for this purpose include, but are not limited to chloroform, benzene or the oil itself. These solutions may be prepared at concentrations ranging from about 1 gram iodine/liter of solution to about 100 grams iodine/liter of solution and preferably, from about 10 to about 20 grams iodine/liter of solution. These solutions may then be added to the oil volumetrically. This approach will be found particularly convenient for a continuous process where the iodine solution can be injected, on a continuous basis, into a flowing stream of the oil to be treated. In such a situation it is, of course, preferable that the oil stream be in the turbulent flow regime so as to promote uniform mixing of the iodine in the oil.

When treating an oil with iodine in accordance with the method of this invention, the effect of the iodine on the oil is achieved essentially instantaneously upon contact between the iodine and the oil. Thus, an actual residence time need not be specified. The treatment is complete, and the oil ready for use in oil treating sulfur, upon the formation of a uniform solution of the iodine in the oil.

The oils which are treated in accordance with the present invention are those oils which are used in the oil-treatment of sulfur. These oils are generally referred to as processing oils or rubber processing oils, and include naphthenic oils which are light in color and have viscosities of from about 50 to about 250 ssu at 100° F.; perferably about 100 ssu.

It is to be noted that not all of the processing oils used in the oil treating of sulfur cause an acceleration in the rate of reversion of insoluble sulfur to soluble sulfur. Some processing oils may be used without adversely affecting the stability of the sulfur being treated. When these are used, it will not be necessary to treat them in accordance with the method of this invention.

Unfortunately, however, there is no technique known by which it may conveniently be determined whether or not any particular oil will cause an accelerated rate of reversion, short of actual experimention. Accordingly, actual experimentation will be required to determine whether or not the oil should be treated.

Once the oil has been treated with iodine in accordance with the method of this invention, it can be mixed with the insoluble sulfur using standard mixing techniques.

The mixing of the sulfur and the oil in accordance with the practice of the present invention is conducted the same way as it is when treating sulfur with oil which has not been treated with iodine. The iodine treatment of the oil has no effect on the remaining processing steps except that it inhibits the oil-caused acceleration of the reversion rate of the sulfur.

The sulfur with which the oil is mixed is an insoluble sulfur, usually containing 90% by wt. or more of polymeric (insoluble) sulfur, the remainder being made up of crystalline (soluble) sulfur. Although not a limitation on the scope of the invention, the sulfur is usually in the form of a very fine powder, having an average particle size of about 3 microns. This sulfur, when not oil treated, is difficult to handle since it can form a fine dust which can present a nuisance to workers. Oil-treatment of the sulfur will generally lessen the severity of this problem.

The sulfur and oil are thoroughly blended together using equipment designed for mixing powders and liquids. The mixing may be accomplished in either a batch or continuous operation, using techniques which are well known in the art, and can be carried out under ambient conditions.

The relative amounts of sulfur and oil which are blended are generally such as to produce a final oil-treated product having from about 1% to about 30% oil by weight of total product.

In order that the present invention be more fully understood, the following examples are given by way of illustration. No specific details or enumeration contained therein should be construed as limitations to the present invention except insofar as they appear in the appended claims. All parts and percentages are by weight unless otherwise specifically designated.

EXAMPLE 1

A sample of commercially-prepared stabilized sulfur was found to have an insoluble sulfur content of 92.8% by weight. One portion of the sulfur was set aside as a control, a second portion was treated with a commercially available processing oil, and a third portion was treated with the same processing oil to which chlorine, in an amount of 15 mg/liter had been added.

The oil treatment consisted of placing 5 grams of sulfur in a crucible and then adding 20 ml. of the oil to the crucible containing the sulfur.

The control sample was also placed in a crucible, but no oil was added.

Each crucible was then sealed in a 4 oz. bottle, which was then placed in a constant temperature oven for four hours at 60° C. The samples were then removed from the oven, washed with carbon disulfide to remove soluble sulfur, and the amount of insoluble sulfur remaining in each sample determined.

The results are tabulated below:

| Sample | Wt. % Insoluble Sulfur (Originally) | Wt. % Insoluble Sulfur (after 4 hrs. at 60° C.) |
|---|---|---|
| Control: | 92.8 | 92.4 |
| Treated with oil: | | 91.2 |
| Treated with oil to which chlorine had been added: | | 91.0 |

These results demonstrate that oil treatment has a destabilizing effect on the sulfur, and that chlorine does not inhibit the destabilizing tendency of the oil.

EXAMPLE 2

The same procedure as was used in Example 1 was employed to determine the effect that treating the oil with bromine or iodine would have on the tendency of the oil to destabilize sulfur. The results are tabulated below:

| Sample | Wt. % Insoluble Sulfur (Originally) | Wt. % Insoluble Sulfur (after 4 hrs. at 60° C.) |
|---|---|---|
| Control: | 93.41 | 92.68 |
| Control: | 93.41 | 92.67 |
| Treated with oil: | — | 91.87 |
| Treated with oil: | — | 91.84 |
| Treated with oil: | — | 91.78 |
| Treated with oil: | — | 91.85 |
| Treated with oil to which bromine had been added: | | 91.98 |
| Treated with oil to which bromine had been added: | 92.02 | |
| Treated with oil to which iodine had been added: | | 92.64 |
| Treated with oil to which iodine had been added: | | 92.70 |

The sulfur which was treated with oil which contained neither bromine nor iodine was less stable than that which had not been oil treated. The addition of bromine to the oil used in treating the sulfur had no significant effect on the tendency of the oil to destabilize the sulfur.

The sulfur which was treated with oil to which iodine had been added, however, had essentially the same stability as the control samples which had not been treated with oil. The destabilizing tendency of the oil was essentially neutralized by the iodine.

This demonstrates that iodine is effective in inhibiting the accelerating effect of oil on the rate of reversion of insoluble sulfur to soluble sulfur.

EXAMPLE 3

The same procedure as was used in the previous examples was employed to determine the effect that treating the oil with iodine would have on the tendency of the oil to destabilize sulfur. The results are tabulated below:

| Sample | Wt. % Insoluble Sulfur (Originally) | Wt. % Insoluble Sulfur (after 4 hrs. at 60° C.) |
|---|---|---|
| Control: | 87.8 | 85.91 |
| Treated with oil: | | 71.48 |
| Treated with oil to which iodine had been added: | | 77.01 |

These results show that the oil treatment accelerated the rate of reversion of the insoluble sulfur, but that the addition of iodine to the oil inhibited its tendency to accelerate the rate of reversion of the insoluble sulfur.

The effects of both the oil and the iodine were substantially more pronounced in this example than in the previous examples because unstabilized sulfur was used in this example while stabilized sulfur was used in the previous examples.

EXAMPLE 4

The same procedure as was used in the previous examples was employed to determine the effect of oils which had been treated with varying amounts of iodine on the stability of stabilized sulfur. The results are tabulated below.

| Amount of Iodine (mg. Iodine/ liter oil) | Wt. % Insoluble Sulfur (Originally) | Wt. % Insoluble Sulfur (after 4 hrs. at 60° C.) |
| --- | --- | --- |
| 0 (control) | 94.5 | 87.3 |
| 10 | | 91.9 |
| 30 | | 91.8 |
| 70 | | 92.4 |
| 0 (control) | 94.5 | 85.2 |
| 100 | | 92.1 |
| 150 | | 92.2 |
| 200 | | 92.1 |
| 0 (control) | 94.5 | 90.6 |
| 5 | | 92.2 |
| 10 | | 92.9 |
| 15 | | 92.7 |
| 20 | | 93.0 |
| 25 | | 92.0 |
| 0 (control) | 94.7 | 82.9 |
| 5 | | 86.2 |
| 10 | | 85.7 |
| 15 | | 84.5 |
| 20 | | 87.4 |
| 25 | | 89.8 |

These results show that as little as 5 milligrams iodine per liter of oil significantly affects the tendency of the oil to accelerate the rate of reversion of the insoluble sulfur.

It will thus be seen that the method of the present invention is effective in inhibiting the accelerating effect of rubber processing oils on the reversion of insoluble sulfur to soluble sulfur.

The objects set forth above among those made apparent from the preceding description are, therefore effectively attained and, since certain changes may be made in the above method without departure from the scope of the invention, it is intended that all matter contained in the above description shall be interpreted as illustrative and not in a limiting sense.

I claim:

1. A method for inhibiting the accelerating effect of a rubber processing oil on the rate of reversion of insoluble sulfur with which it is mixed to soluble sulfur which comprises adding iodine to said oil in an amount sufficient to inhibit said accelerating effect of said oil on the reversion rate of said insoluble sulfur.

2. The method of claim 1 wherein said iodine is elemental iodine.

3. The method of claim 1 wherein said insoluble sulfur is a stabilized insoluble sulfur.

4. In a method for oil-treating insoluble sulfur wherein insoluble sulfur is mixed with an oil to form a solid, particulate insoluble sulfur product the improvement which comprises pretreating said oil to inhibit its destabilizing effect on said insoluble sulfur by blending into said oil an amount of iodine sufficient to inhibit said destabilizing effect.

5. The method of claim 4 wherein said iodine is elemental iodine.

6. The method of claim 4 wherein said insoluble sulfur is a stabilized insoluble sulfur.

7. The method of claim 4 wherein said insoluble sulfur product comprises from about 1 to about 30% oil by weight of product.

* * * * *

UNITED STATES PATENT AND TRADEMARK OFFICE
CERTIFICATE OF CORRECTION

PATENT NO. : 4,238,470
DATED : December 9, 1980
INVENTOR(S) : Randall A. Young

It is certified that error appears in the above-identified patent and that said Letters Patent are hereby corrected as shown below:

Col. 1, line 45 - "beings" should be -- begins --.

Col. 3, line 34 - "increases" should be -- increase --.

Col. 4, line 4  - "directed" should be -- directly --.

Col. 6, line 14 - "92.02" should be under the second column (wt. % Insoluble Sulfur (after 4 hrs. at 60°C.))

Signed and Sealed this

Tenth Day of March 1981

[SEAL]

Attest:

RENE D. TEGTMEYER

Attesting Officer     Acting Commissioner of Patents and Trademarks